(12) United States Patent
Takahashi et al.

(10) Patent No.: US 12,046,976 B2
(45) Date of Patent: Jul. 23, 2024

(54) ROTARY RECIPROCATING DRIVE ACTUATOR WITH MOVABLE BODY AND DRIVE UNIT AND WALL WITH POSITION SENSOR

(71) Applicants: Yuki Takahashi, Tokyo (JP); Masaharu Kagami, Tokyo (JP); Yasutaka Kitamura, Tokyo (JP)

(72) Inventors: Yuki Takahashi, Tokyo (JP); Masaharu Kagami, Tokyo (JP); Yasutaka Kitamura, Tokyo (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 0 days.

(21) Appl. No.: 18/195,957

(22) Filed: May 11, 2023

(65) Prior Publication Data

US 2023/0283156 A1   Sep. 7, 2023

Related U.S. Application Data

(63) Continuation of application No. 17/120,176, filed on Dec. 13, 2020, now Pat. No. 11,664,713.

(30) Foreign Application Priority Data

Dec. 13, 2019 (JP) ................................. 2019-225570

(51) Int. Cl.
*H02K 33/18* (2006.01)
*H02K 33/12* (2006.01)
(52) U.S. Cl.
CPC ............. *H02K 33/18* (2013.01); *H02K 33/12* (2013.01)

(58) Field of Classification Search
CPC ... B81B 3/0078; B81B 3/0045; B81B 3/0072; B81B 2203/0154; G02B 3/0072;
(Continued)

(56) References Cited

U.S. PATENT DOCUMENTS 4,196,456 A * 4/1980 Manzke ............... G11B 5/5521
4,314,295 A * 2/1982 Frandsen ............... H02K 41/03
360/78.12

(Continued)

FOREIGN PATENT DOCUMENTS

EP         3817204      5/2021
JP        61-129804     6/1986
(Continued)

OTHER PUBLICATIONS

JP-2012068451-A English Translation (Year: 2012).*
(Continued)

*Primary Examiner* — Maged M Almawri (57) ABSTRACT

A rotary reciprocating drive actuator which includes a base portion including a bottom portion, and a pair of wall portions erected from both ends of the bottom portion; a movable body including a shaft portion rotatably supported by the pair of the wall portions via a bearing in such a manner that a movable magnet disposed at an outer side surface of one wall portion of the pair of the wall portions; and a drive unit including a core body and a coil body, the drive unit being attached to the outer side surface of the one wall portion, wherein another wall portion of the pair of wall portions is configured to be detachable from or adjustable in position with respect to the bottom portion.

6 Claims, 10 Drawing Sheets

(58) Field of Classification Search
CPC .... G02B 26/085; G02B 26/10; G02B 26/105; G02B 27/0176; Y10T 74/10
USPC .... 310/300–309, 40 MM, 15–25; 359/196.1, 359/199.4, 201.2, 203.1, 197.1, 223.1, 359/224.1, 211.5
See application file for complete search history.

(56) References Cited

U.S. PATENT DOCUMENTS

| | | | | |
|---|---|---|---|---|
| 4,340,833 A * | 7/1982 | Sudo | H02K 3/26 | 310/268 |
| 4,370,019 A * | 1/1983 | Shirasaki | G02B 26/121 | 359/199.1 |
| 4,490,635 A * | 12/1984 | Harrison | G11B 5/5556 | 360/78.12 |
| 4,502,752 A * | 3/1985 | Montagu | G02B 7/1821 | 318/128 |
| 4,509,109 A * | 4/1985 | Hansen | H01F 5/003 | 335/282 |
| 4,626,717 A * | 12/1986 | Hensing | H02K 33/16 | 310/38 |
| 4,658,162 A * | 4/1987 | Koyama | H02K 29/08 | 318/135 |
| 4,919,500 A * | 4/1990 | Paulsen | G02B 26/08 | 359/214.1 |
| 4,974,918 A * | 12/1990 | Delache | G02B 26/08 | 310/38 |
| 5,097,355 A * | 3/1992 | Eden | G02B 26/10 | 359/213.1 |
| 5,187,612 A * | 2/1993 | Plesko | G06K 7/10881 | 359/200.7 |
| 5,206,762 A * | 4/1993 | Kasahara | G11B 7/093 | |
| 5,283,682 A * | 2/1994 | Ostaszewski | G02B 7/1821 | 310/22 |
| 5,337,865 A * | 8/1994 | Kasahara | G11B 7/0932 | 188/267.2 |
| 5,596,442 A | 1/1997 | Plesko | | |
| 5,606,447 A * | 2/1997 | Asada | G02B 26/0816 | 359/198.1 |
| 5,610,752 A * | 3/1997 | Hayakawa | G06K 7/10584 | 359/198.1 |
| 5,703,555 A * | 12/1997 | McCann | H02K 26/00 | 310/40 R |
| 5,787,067 A * | 7/1998 | Song | G11B 33/08 | |
| 5,982,521 A * | 11/1999 | Bessho | G02B 26/105 | 359/198.1 |
| 6,046,583 A * | 4/2000 | Ayres | G01R 7/06 | 324/154 PB |
| 6,064,471 A * | 5/2000 | Nakagawa | G01S 7/4817 | 359/199.1 |
| 6,144,281 A * | 11/2000 | Lorris | H01F 5/003 | 336/200 |
| 6,188,502 B1 * | 2/2001 | Aoki | G02B 27/20 | 359/198.1 |
| 6,327,066 B2 * | 12/2001 | Takishima | G11B 7/08576 | 250/236 |
| 6,421,208 B1 * | 7/2002 | Oveyssi | H02K 41/0358 | 310/15 |
| 6,781,259 B2 * | 8/2004 | Hente | H02K 33/18 | 310/13 |
| 7,476,999 B2 * | 1/2009 | Friedland | H02K 33/18 | 310/264 |
| 7,697,180 B2 * | 4/2010 | Nakajima | G02B 26/127 | 359/213.1 |
| 7,719,396 B2 * | 5/2010 | Umeda | H02K 33/16 | 359/199.1 |
| 7,773,281 B2 * | 8/2010 | Maeno | G02B 26/085 | 359/200.7 |
| 7,990,595 B1 * | 8/2011 | Chou | G02B 26/101 | 359/200.7 |
| 8,031,386 B2 * | 10/2011 | Hirose | H02P 23/14 | 250/236 |
| 8,130,436 B2 * | 3/2012 | Borchers | G02B 26/085 | 359/200.7 |
| 8,144,380 B2 * | 3/2012 | Takeuchi | G02B 26/085 | 359/200.7 |
| 8,362,751 B2 * | 1/2013 | Lin | H02K 3/26 | 336/200 |
| 8,390,909 B2 * | 3/2013 | Plesko | G02B 26/105 | 359/200.7 |
| 8,456,724 B2 * | 6/2013 | Lin | G02B 26/101 | 359/199.1 |
| 8,582,191 B2 * | 11/2013 | Borchers | G02B 26/105 | 359/200.7 |
| 8,752,969 B1 * | 6/2014 | Kane | G01C 11/025 | 359/872 |
| 9,035,502 B2 * | 5/2015 | Park | G02B 27/646 | 310/12.21 |
| 9,825,499 B2 * | 11/2017 | Rajasingham | H02K 21/24 | |
| 9,997,984 B2 * | 6/2018 | Fujimoto | B81B 3/0043 | |
| 10,048,064 B2 * | 8/2018 | Munro | G01S 17/42 | |
| 10,101,457 B1 * | 10/2018 | Topliss | G02B 26/101 | |
| 2001/0021165 A1 * | 9/2001 | Nakagishi | G11B 7/08576 | 369/255 |
| 2002/0181839 A1 * | 12/2002 | Brown | G02B 6/3572 | 385/16 |
| 2005/0116800 A1 * | 6/2005 | Nelson | H02K 26/00 | 310/36 |
| 2005/0185239 A1 * | 8/2005 | Orcutt | G02B 26/0833 | 359/199.1 |
| 2006/0131965 A1 * | 6/2006 | Friedland | H02K 26/00 | 310/12.22 |
| 2007/0047047 A1 * | 3/2007 | Takeuchi | G02B 26/105 | 359/206.1 |
| 2009/0128878 A1 * | 5/2009 | Jun | G01R 33/07 | 324/207.2 |
| 2009/0185250 A1 * | 7/2009 | Turner | G02B 26/105 | 359/199.1 |
| 2009/0310198 A1 * | 12/2009 | Woo | G02B 26/105 | 359/200.7 |
| 2011/0069365 A1 * | 3/2011 | Edmonds | G06K 7/10643 | 310/38 |
| 2011/0228367 A1 * | 9/2011 | Lubianiker | G02B 26/085 | 318/116 |
| 2012/0002259 A1 * | 1/2012 | Plesko | G02B 26/105 | 359/200.7 |
| 2012/0062048 A1 * | 3/2012 | Kaneko | H02K 7/06 | 310/20 |
| 2012/0120458 A1 * | 5/2012 | Hino | G02B 26/085 | 74/25 |
| 2013/0200158 A1 * | 8/2013 | Feng | G02B 26/105 | 235/462.36 |
| 2013/0229698 A1 * | 9/2013 | Honda | G02B 26/10 | 359/199.3 |
| 2014/0118809 A1 * | 5/2014 | Honda | G02B 26/10 | 359/199.3 |
| 2015/0042870 A1 * | 2/2015 | Chan | H04N 23/69 | 359/733 |
| 2016/0077331 A1 * | 3/2016 | Walter | G02B 26/105 | 359/200.7 |
| 2016/0178894 A1 * | 6/2016 | Rose | G02B 26/085 | 359/199.3 |
| 2016/0223319 A1 * | 8/2016 | Munro | G01S 17/89 | |
| 2018/0024350 A1 * | 1/2018 | Kumihashi | H04N 23/687 | 348/208.2 |
| 2019/0204585 A1 * | 7/2019 | Coffin | G01J 3/06 | |
| 2019/0331910 A1 | 10/2019 | Matsuka et al. | | |
| 2020/0249469 A1 * | 8/2020 | Raab | H02K 3/46 | |
| 2021/0065948 A1 * | 3/2021 | Claeyssen | H02K 1/34 | |
| 2021/0184554 A1 * | 6/2021 | Takahashi | H02K 33/12 | |
| 2021/0265904 A1 | 8/2021 | Takahashi et al. | | |
| 2021/0364609 A1 * | 11/2021 | Hall | G01S 17/89 | |
| 2022/0043255 A1 * | 2/2022 | Kitamura | G02B 26/105 | |

FOREIGN PATENT DOCUMENTS

| | | |
|---|---|---|
| JP | 62-237302 | 10/1987 |
| JP | 62-260557 | 11/1987 |

(56) References Cited

FOREIGN PATENT DOCUMENTS

| JP | 05-181078 | 7/1993 | | |
|---|---|---|---|---|
| JP | 2000-134901 | 5/2000 | | |
| JP | 2003-043405 | 2/2003 | | |
| JP | 2004-074166 | 3/2004 | | |
| JP | 2007-333873 | 12/2007 | | |
| JP | 2007333873 A | * 12/2007 | ........... | G02B 26/085 |
| JP | 2008-047648 | 2/2008 | | |
| JP | 2008-301626 | 12/2008 | | |
| JP | 2012-068451 | 4/2012 | | |
| JP | 2012068451 A | * 4/2012 | ......... | G02B 26/0816 |
| JP | 2014-182167 | 9/2014 | | |
| JP | 2018-106059 | 7/2018 | | |
| JP | 2018-121167 | 8/2018 | | |
| JP | 2019-191402 | 10/2019 | | |
| KR | 10-1993-0005974 | 6/1993 | | |
| KR | 10-2006-0024430 | 3/2006 | | |
| WO | WO 2013/183435 | 12/2013 | | |
| WO | WO 2020/004514 | 1/2020 | | |

OTHER PUBLICATIONS

Notice of Opinion Submission Dated Nov. 8, 2022 From the Korean Intellectual Property Office Re. Application No. 10-2020-7038096. (5 Pages).

European Search Report and the European Search Opinion Dated Apr. 21, 2021 From the European Patent Office Re. Application No. 20213479.7. (8 Pages).

Final Official Action Dated Sep. 2, 2022 From the US Patent and Trademark Office Re. U.S. Appl. No. 17/120,176. (13 Pages).

Interview Summary Dated Nov. 25, 2022 from the US Patent and Trademark Office Re. Application No. 17/120,176. (2 pages).

Notice of Allowance Dated Jan. 19, 2023 together with Interview Summary Dated Dec. 27, 2022 From the US Patent and Trademark Office Re. U.S. Appl. No. 17/120,176. (22 Pages).

Notice of Opinion Submission Dated Apr. 6, 2023 From the Korean Intellectual Property Office Re. Application No. 10-2020-7038096. (5 Pages).

Notice of Opinion Submission Dated Nov. 11, 2022 From the Korean Intellectual Property Office Re. Application No. 10-2020-7038096. (5 Pages).

Notice of Reasons for Rejection Dated May 10, 2022 From the Japan Patent Office Re. Application No. 2019-225570. (4 Pages).

Notification of Office Action Dated Nov. 15, 2022 From the State Intellectual Property Office of the People's Republic of China Re. Application No. 202011264090.7. (7 Pages).

Official Action Dated May 25, 2022 from US Patent and Trademark Office Re. U.S. Appl. No. 17/120,176. (22 pages).

Official Action Dated Jun. 30, 2023 From the US Patent and Trademark Office Re. U.S. Appl. No. 17/255,227. (52 Pages).

* cited by examiner

ROTARY RECIPROCATING DRIVE ACTUATOR WITH MOVABLE BODY AND DRIVE UNIT AND WALL WITH POSITION SENSOR

RELATED APPLICATIONS

This application is a Continuation of U.S. Patent application Ser. No. 17/120,176 filed on Dec. 13, 2020, which claims the benefit of priority of Japanese Patent Application No. 2019-225570 filed on Dec. 13, 2019. The contents of the above applications are all incorporated by reference as if fully set forth herein in their entirety.

FIELD AND BACKGROUND OF THE INVENTION

The present invention relates to a rotary reciprocating drive actuator.

For example, a rotation drive actuator is used in a scanner in a multifunction peripheral, a laser beam printer and other apparatuses. Specifically, a rotary reciprocating drive actuator changes a reflection angle of a laser beam by rotating a mirror of the scanner in a reciprocating manner to realize optical scanning with respect to an object.

Conventionally, the scanner using a galvanometer motor as this type of the rotary reciprocating drive actuator is disclosed in such as PTL 1 and PTL 2. Various types of the galvanometer motor, such as a coil movable type in which a coil is attached to the mirror and a structure disclosed in PTL 1, are known.

Incidentally, PTL 1 discloses a beam scanner in which four permanent magnets are provided on a rotating shaft to which the mirror is attached so as to be magnetized in the radial direction of the rotating shaft, and a core having magnetic poles around which the coil is wound is disposed so as to sandwich the rotating shaft.

CITATION LIST

Patent Literature
PTL 1: Japanese Patent Application Laid-Open No. 2007-333873
PTL 2: Japanese Patent Application Laid-Open No. 2014-182167

SUMMARY OF INVENTION

By the way, in the rotary reciprocating drive actuator of the coil movable type, heat generated by the coil during driving may adversely affect such as a surface state of the mirror, a bonding state of the mirror to the rotating shaft and a shape of the mirror including a warp. Further, in the rotary reciprocating drive actuator of the coil movable type, considering a heat generation of the coil at the time of energization, there are problems that an input current to the coil is difficult to increase and a size and an amplitude of the mirror to be a movable body are difficult to increase. Further, there is a problem that an assemblability is poor, because it is necessary to pull out wirings to the coil to a fixed body side with respect to the mirror to be the movable body.

In PTL 1, since the magnets are disposed on the movable body side, the above problem of the coil movable type can be solved. In PTL 1, however, two magnets per one core pole and a total of four magnets are required in order to make the magnet stationary at the neutral position with respect to the core, that is, in order to position a switching portion of the magnetic pole of the magnet at the center of the core.

Thereby, there is a problem that the amplitude of the movable body is reduced, that is, a swing range is reduced, as compared with the case where an equivalent rotary reciprocating drive actuator is configured by using two poles magnet, for example. Further, since at least four magnets are used, a number of parts is large, the structure is complicated and the assembly is difficult.

Further, in recent years, as a rotary reciprocating drive actuator used in a scanner, a rotary reciprocating drive actuator that has rigidity, impact resistance and vibration resistance, improves assemblability and can achieve high amplitude is desired on the assumption that the mirror to be the movable body is enlarged and the like.

Further, as also described in PTL 1, the rotary reciprocating drive actuator is provided with an angle sensor for detecting a rotation angle of the rotation shaft connected to the mirror. A scanning accuracy as a scanner greatly depends on a detection accuracy of the angle sensor. In order to improve the detection accuracy of the angle sensor, it is necessary to adjust a mounting position of the angle sensor with high accuracy so that the relative relationship between the angle sensor and the other components of the rotary reciprocating drive actuator such as the mirror becomes a determined relationship. Such requirements make it difficult to assemble the rotary reciprocating drive actuator.

The present invention has been made in consideration of the above points, and provides a rotary reciprocating drive actuator which can be easily assembled and can drive a movable object at a high amplitude.

According to one aspect of a rotary reciprocating drive actuator of the present invention, the rotary reciprocating drive actuator comprising:
  a base portion;
  a movable magnet fixed to a shaft portion to which a movable object is connected; and
  a drive unit having a core body and a coil body for generating a magnetic flux in the core body when current is supplied, and driving the movable magnet in a rotary reciprocating manner by an electromagnetic interaction between the magnetic flux generated from the core body and the movable magnet,
  wherein the movable magnet is formed in a ring shape, and is configured by alternately magnetizing an even number of magnetic poles forming an S-pole and an N-pole at an outer periphery of the shaft portion;
  a number of magnetic poles of the core body and a number of magnetic poles of the movable magnet are equal to each other;
  an even number of magnetic poles of the core body is respectively arranged to face the movable magnet with an air gap therebetween on the outer peripheral side of the shaft portion;
  the drive unit is provided with a magnet position holding portion which is a magnetic material provided to face the movable magnet and magnetically attracts the movable magnet to a reference position;
  a pair of wall portions is erected on the base portion to rotatably support the shaft portion via a bearing, and the movable object is disposed between the pair of wall portions; and
  the drive unit is attached to one wall portion of the pair of wall portions, and an angle sensor portion for detecting the rotation angle of the shaft portion is attached to the other wall portion of the pair of wall portions.

According to the present invention, since the magnet position holding portion for magnetically attracting the movable magnet to the reference position is provided, even if the movable object is a large sized mirror, it can be driven at a high amplitude. Further, since the angle sensor portion is attached to the other wall portion with respect to the wall portion to which the drive unit is attached in the pair of wall portions, it can be easily assembled.

DESCRIPTION OF SPECIFIC EMBODIMENTS OF THE INVENTION

Hereinafter, embodiments of the present invention will be described with reference to the drawings.

<1> Entire Configuration of a Rotary Reciprocating Drive Actuator

Figure 1:
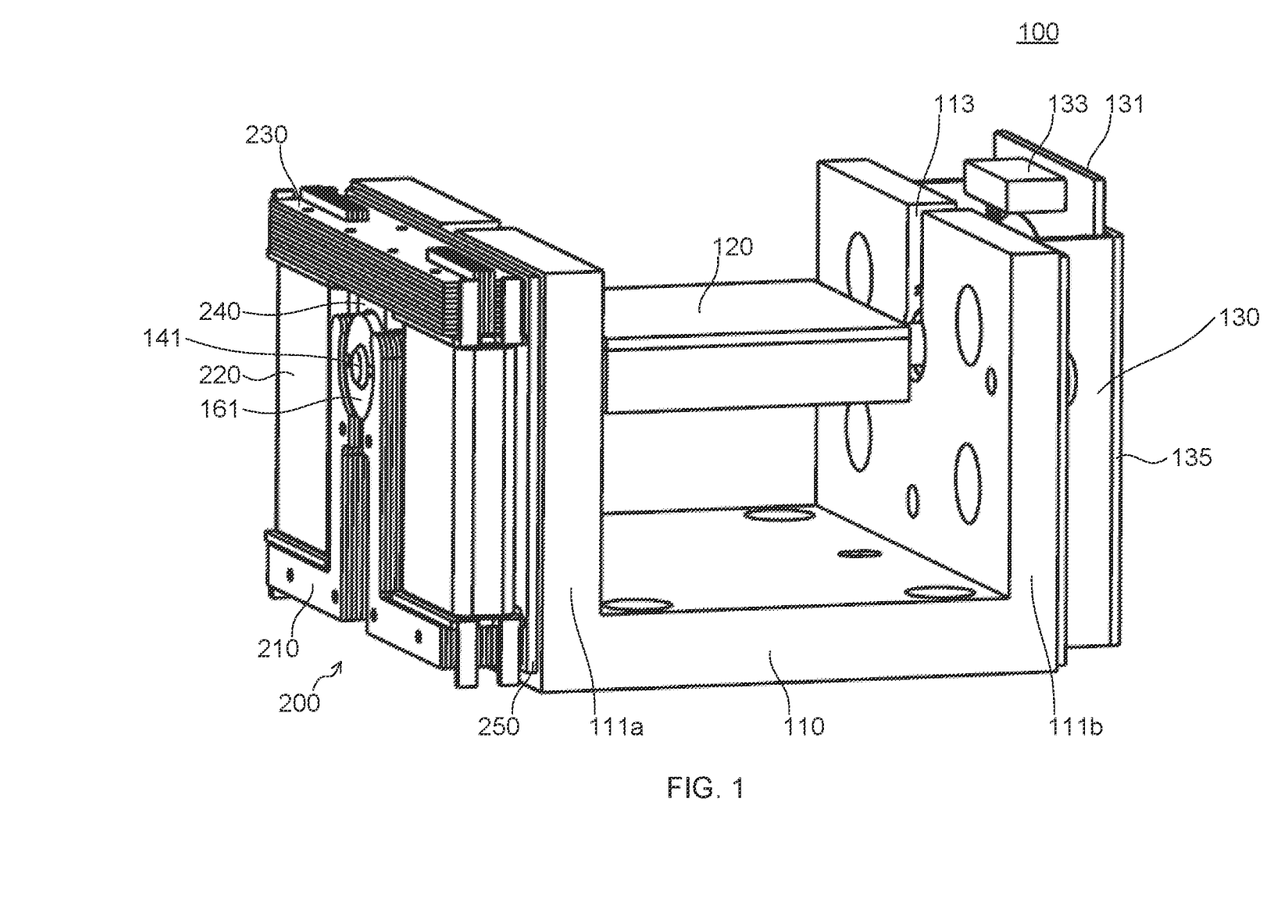
FIG. 1 is an external perspective view of a rotary reciprocating drive actuator of an embodiment.
Figure 2:
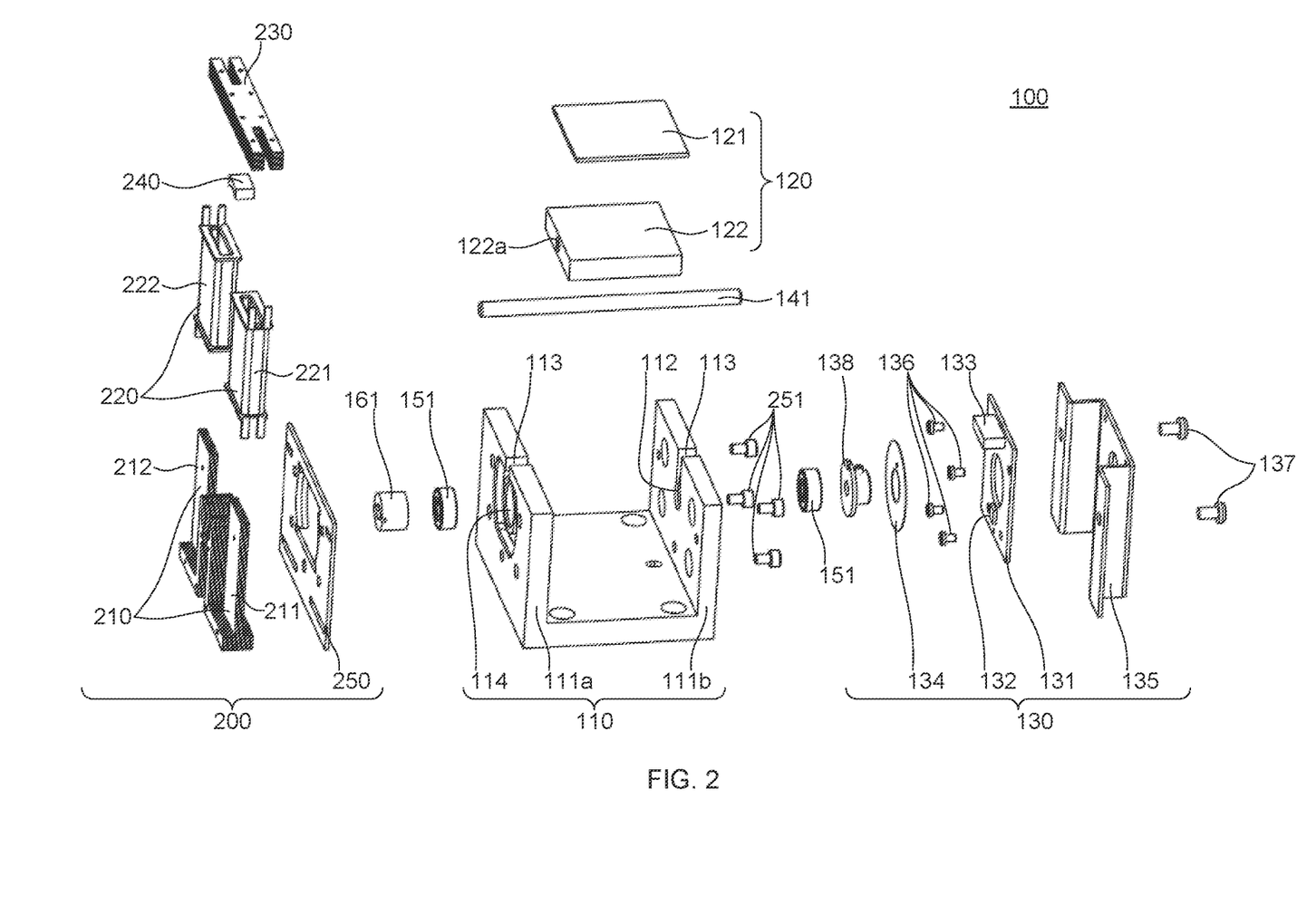
FIG. 2 is an exploded perspective view of the rotary reciprocating drive actuator.

FIG. 1 is an external perspective view of rotary reciprocating drive actuator 100 of the embodiment. FIG. 2 is an exploded perspective view of rotary reciprocating drive actuator 100.

Rotary reciprocating drive actuator 100 is used, for example, in a LIDAR (Laser Imaging Detection and Ranging) apparatus. Note that, rotary reciprocating drive actuator 100 is also applicable to a scanner in a multifunction peripheral, a laser beam printer and other apparatuses.

Rotary reciprocating drive actuator 100 is roughly divided into base portion 110; mirror portion 120 rotatably supported by base portion 110; drive unit 200 for driving mirror portion 120 in a rotary reciprocating manner; and angle sensor portion 130 for detecting a rotational angle position of mirror portion 120.

As can be seen from FIG. 2, mirror 121 is attached to one surface of substrate 122 in mirror portion 120. Shaft portion 141 is inserted into insertion hole 122a of substrate 122, and substrate 122 and shaft portion 141 are fastened.

Base portion 110 is a member having a substantially U-shaped cross section and having a pair of wall portions 111a and 111b. Insertion hole 112 through which shaft portion 141 is inserted is formed in each of the pair of wall portions 111a and 111b. Further, notched holes 113 communicating insertion holes 112 and the outer edges of wall portions 111a and 111b are formed in the pair of wall portions 111a and 111b, respectively.

Thus, shaft portion 141 can be disposed at positions of insertion holes 112 through notched holes 113 in a state where mirror portion 120 is fastened to shaft portion 141. In the case where notched holes 113 are not provided, a complicated assembly operation is required in which shaft portion 141 is inserted into both insertion holes 112 of wall portions 111a, 111b and insertion hole 122a of substrate 122 while mirror portion 120 is disposed between the pair of wall portions 111a and 111b, and shaft portion 141 and substrate 122 are fastened. In contrast, in the present embodiment, since notched holes 113 are formed, shaft portion 141 to which mirror portion 120 is fastened in advance can be easily inserted into insertion holes 112.

Ball bearings 151 are attached to both ends of shaft portion 141. Ball bearings 151 are mounted to bearing mounting portions 114 formed at the positions of insertion holes 112 of the pair of wall portions 111a and 111b. Thus, shaft portion 141 is rotatably attached to base portion 110 via ball bearings 151, and mirror portion 120 to be the movable object is disposed between the pair of wall portions 111a and 111b.

Further, movable magnet 161 is fastened to one end of shaft portion 141. Movable magnet 161 is disposed inside of drive unit 200 and is driven in a rotary reciprocating manner by a magnetic flux generated by drive unit 200.

As described above, in the present embodiment, shaft portion 141 to which mirror portion 120 to be the movable object is attached is pivotally supported by the pair of wall portions 111a and 111b of base portion 110 so as to support mirror portion 120 from both sides. Thus, mirror portion 120 is supported more firmly than the case where shaft portion 141 is pivotally supported in a cantilever manner, and a shock resistance and a vibration resistance are improved.

As can be seen from FIG. 2, drive unit 200 has core body 210 and coil body 220. A coil is provided with a winding inside of coil body 220. Core body 210 includes first core body 211 and second core body 212. Similarly, coil body 220 includes first coil body 221 and second coil body 222. Coil body 220 is mounted so as to be inserted into a part of core body 210. Thus, when the coil of coil body 220 is energized, core body 210 is excited.

Core body 210 and coil body 220 are fixed to fixing plate 250, and fixing plate 250 is fixed to wall portion 111a of base portion 110 via fastening members 251.

Incidentally, in the present embodiment, drive unit 200 further includes bridging core 230 and magnet position holding portion 240. Bridging core 230 has the same structure as core body 210. Magnet position holding portion 240 is made of a magnet. A position of movable magnet 161 is magnetically attracted to a movement reference position by a magnetic force of magnet position holding portion 240. This will be described in detail later.

In the example of the present embodiment, core body 210 and bridging core 230 are laminated cores, and are formed by laminating, for example, silicon steel plates.

Angle sensor portion 130 includes circuit board 131; optical sensor 132 and connector 133 mounted on circuit board 131; encoder disk 134; and case 135. Circuit board 131 is fixed to case 135 by fastening members 136. Case 135 is fixed to wall portion 111b by fastening members 137.

Encoder disk 134 is mounted by fastening to shaft portion 141 via mounting member 138, and rotates integrally with movable magnet 161 and mirror portion 120. That is, mounting member 138 has an insertion hole through which shaft portion 141 is inserted and fastened, and a flange portion to which encoder disk 134 is abutted and fastened, and mounting member 138 is fixed to both shaft portion 141 and encoder disk 134. As a result, a rotational position of encoder disk 134 is the same as a rotational position of shaft portion 141. Optical sensor 132 emits light to encoder disk 134 and detects the rotational position (angle) of encoder disk 134 based on the reflected light. Thus, the rotational positions of movable magnet 161 and mirror portion 120 can be detected by optical sensor 132.

In the rotary reciprocating drive actuator 100 of the present embodiment, the movable body having movable magnet 161 and shaft portion 141, and drive unit 200 having coil body 220, core body 210, and the like are attached to an outer surface side of one wall portion 111*a* of the pair of wall portions 111*a* and 111*b* of base portion 110. On the other hand, angle sensor portion 130 for detecting the rotation angle of shaft portion 141 is attached to an outer surface side of the other wall portion 111*b* of the pair of wall portions 111*a* and 111*b* of base portion 110.

This makes it easy to remove angle sensor portion 130 and adjust an assembly position thereof. Since angle sensor portion 130 can be easily removed, angle sensor portion 130 can be easily replaced when a failure occurs in angle sensor portion 130. Further, angle sensor portion 130 can be assembled at the final stage of assembly. As a result, the expensive angle sensor portion 130 can be assembled after it is confirmed that the assembly of the other components is normal. Therefore, a risk of wasting the expensive angle sensor portion 130 due to the assembly failure of the other components can be suppressed.

<2> Detailed Configuration and Operation of Rotary Reciprocating Drive Actuator

Next, detailed configuration and operation of rotary reciprocating drive actuator 100 will be described with reference to FIGS. 3 to 5.

Figure 3:
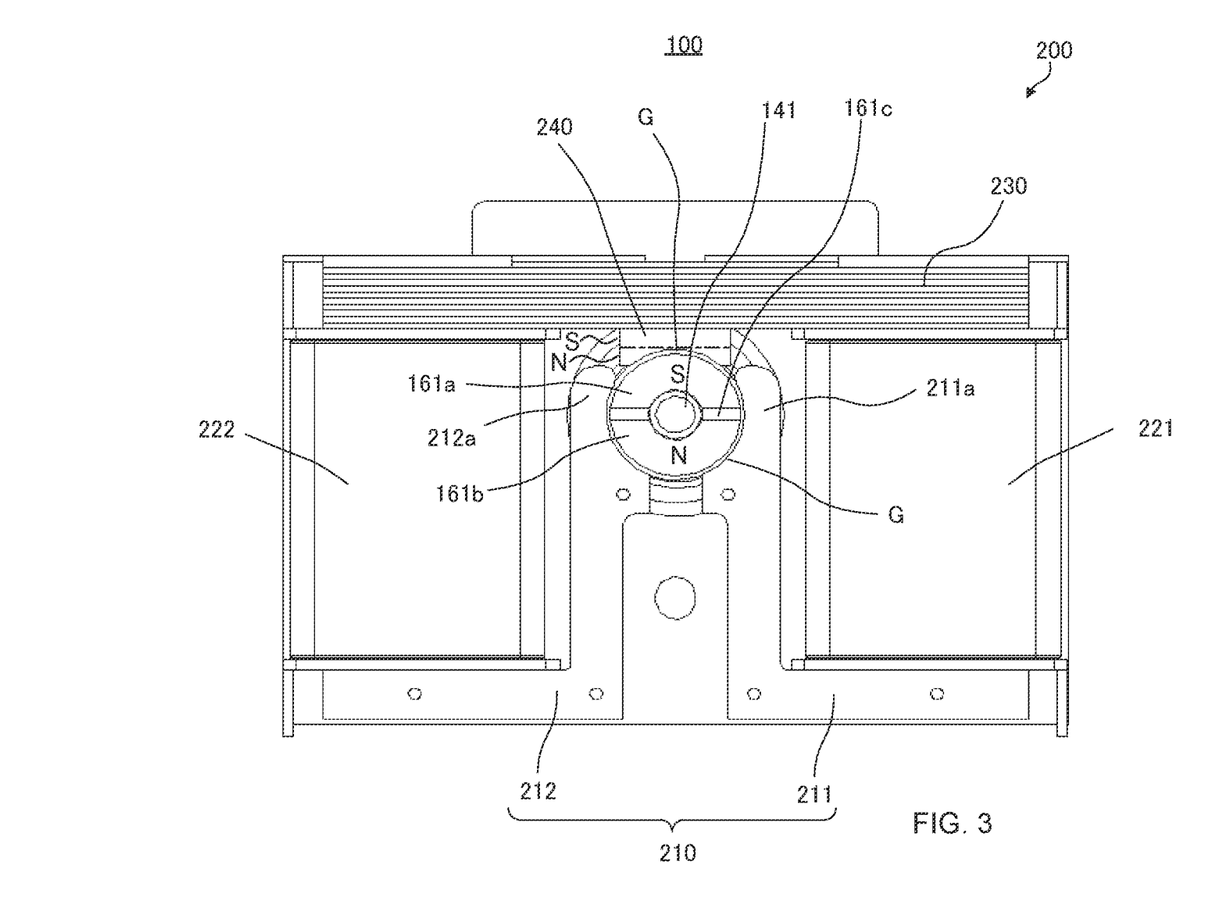
FIG. 3 is a side view of the rotary reciprocating drive actuator of FIG. 1 viewed from a drive unit side.

FIG. 3 is a side view of rotary reciprocating drive actuator 100 of FIG. 1 viewed from the left side of FIG. 1. That is, drive unit 200 is mainly shown in FIG. 3.

In rotary reciprocating drive actuator 100, the movable body including movable magnet 161, shaft portion 141 and other portions is rotatably held by the magnetic attraction force, that is, a magnetic spring, between magnet position holding portion 240 and movable magnet 161, so that the movable body is positioned at the movement reference position in the normal state. Here, the normal state is a state where coil body 220 is not energized.

Positioning the movable body at the movement reference position means that movable magnet 161 is positioned at a neutral position with respect to magnetic poles 211*a* and 212*a* of core body 210 excited by coil body 220 in the present embodiment, and it is a position capable of rotating similarly in either one direction and the other direction around the shaft (normal rotation and reverse rotation viewed from shaft portion 141 side). In other words, the movement reference position at which magnet position holding portion 240 magnetically attracts movable magnet 161 is a rotational center position of the rotating reciprocation of movable magnet 161. When the movable body is positioned at the movement reference position, magnetic pole switching portions 161*c* of movable magnet 161 are positioned at positions facing the magnetic poles of coil body 220 side.

By the cooperation of movable magnet 161 and coil body 220, shaft portion 141 of the movable body rotates in one direction and in the other direction around the shaft from the movement reference position in a reciprocating manner with respect to base portion 110.

Movable magnet 161 is formed in a ring shape, and has an even number of magnetic poles 161*a*, 161*b* in which an S-pole (a South pole) and an N-pole (a North pole) are alternately magnetized in a direction orthogonal to the rotational axis direction of shaft portion 141 at an outer periphery of shaft portion 141. Although movable magnet 161 is magnetized to two poles in the present embodiment, it may be magnetized to two or more poles depending on an amplitude at the time of movement.

The even number of magnetic poles 161*a* and 161*b* has magnetization surfaces of different polarities facing opposite direction to each other across shaft portion 141. In the present embodiment, magnetic poles 161*a* and 161*b* have different polarities in which a plane along the axial direction of shaft portion 141 is as a boundary thereof.

Further, the even number of magnetic poles 161*a* and 161*b* is configured to magnetize at equal intervals at the outer periphery of shaft portion 141.

As described above, in movable magnet 161, the even number of magnetic poles 161*a* and 161*b* forming the S-pole and the N-pole is alternately arranged at the outer periphery of shaft portion 141, and the magnetic poles 161*a* and 161*b* are arranged at equal intervals.

More specifically, in movable magnet 161, each of semicircular portions constitutes different magnetic poles 161*a* and 161*b*. Arc shaped curved surfaces of the semicircular portions are magnetization surfaces of different magnetic poles 161*a* and 161*b*, and the magnetization surfaces of different magnetic poles 161*a* and 161*b* are configured to extend in a circumferential direction around the shaft. In other words, the magnetization surfaces of magnetic poles 161*a* and 161*b* are arranged in a direction orthogonal to the axial direction of shaft portion 141, and are rotated to be able to face to magnetic pole 211*a* of first core body 211 and magnetic pole 212*a* of second core body 212, respectively.

A number of magnetic poles of movable magnet 161 is equal to a number of magnetic poles of core body 210.

Magnetic pole switching portions 161*c* of magnetic poles 161*a* and 161*b* of movable magnet 161 are located at positions facing center positions in a width direction of magnetic pole 211*a* of first core body 211 and magnetic pole 212*a* of second core body 212 when coil body 220 is not energized.

First core body 211 and second core body 212 are parallel to each other, and have core portions 211*b* and 212*b* (see FIG. 4) which are formed so as to sandwich movable magnet 161. First coil body 221 and second coil body 222 are respectively extrapolated to core portions 211*b* and 212*b*. Bridging core 230 is provided to be bridged between one end portions of core portions 211*b* and 212*b*, and magnetic poles 211*a* and 212*a* are formed continuously on the other end portions of core portions 211*b* and 212*b*.

As described above, core body 210 has core portions 211*b* and 212*b* to which first coil body 221 and second coil body 222 are extrapolated; magnetic poles 211*a* and 212*a*; and bridging core 230 provided to be bridged between the end portions opposite to magnetic poles 211*a* and 212*a*. That is, core body 210 is configured from three split bodies. Among these split bodies, bridging core 230 is provided with magnet position holding portion 240.

Two magnetic poles 211*a* and 212*b* are disposed to face each other so as to sandwich movable magnet 161 with air gap G between them and the outer periphery of movable magnet 161.

Magnet position holding portion 240, which is disposed to face movable magnet 161 with air gap G therebetween, is attached to bridging core 230 so as to project convexly toward movable magnet 161 side.

Figure 4:
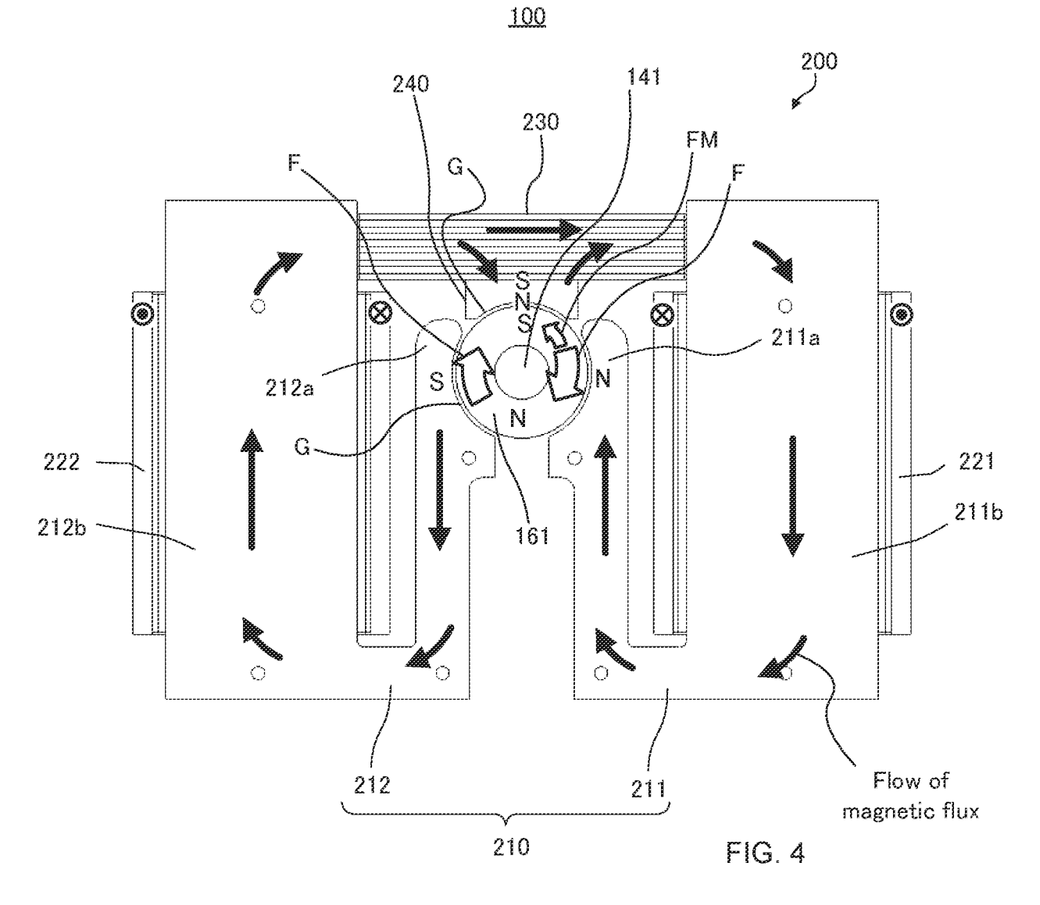
FIG. 4 is a view for explaining an operation of a magnetic circuit of the rotary reciprocating drive actuator.

Magnet position holding portion 240 is, for example, a magnet whose opposing surface is magnetized to the N-pole (see FIG. 4). Magnet position holding portion 240 may be formed integrally with bridging core 230.

Magnet position holding portion 240 functions as a magnetic spring together with movable magnet 161 by the magnetic attraction force generated between it and movable magnet 161, and positions and holds the position of rotating movable magnet 161 at the movement reference position.

Magnet position holding portion 240 is a magnet magnetized toward movable magnet 161. Magnet position holding portion 240 positions magnetic pole switching portions 161c of movable magnet 161 at positions facing magnetic poles 211a and 212a when movable magnet 161 is positioned at the movement reference position. As described above, magnet position holding portion 240 and movable magnet 161 are attracted to each other, and magnet position holding portion 240 can position movable magnet 161 at the movement reference position. Thus, magnetic pole switching portions 161c of movable magnet 161 face magnetic pole 211a of first core body 211 and magnetic pole 212a of second core body 212. At this position, drive unit 200 generates the maximum torque to stably drive the movable body.

Further, since movable magnet 161 is magnetized with two poles, the movable object can be easily driven at a high amplitude and vibration performance can be improved by cooperation with core body 210.

Figure 5:
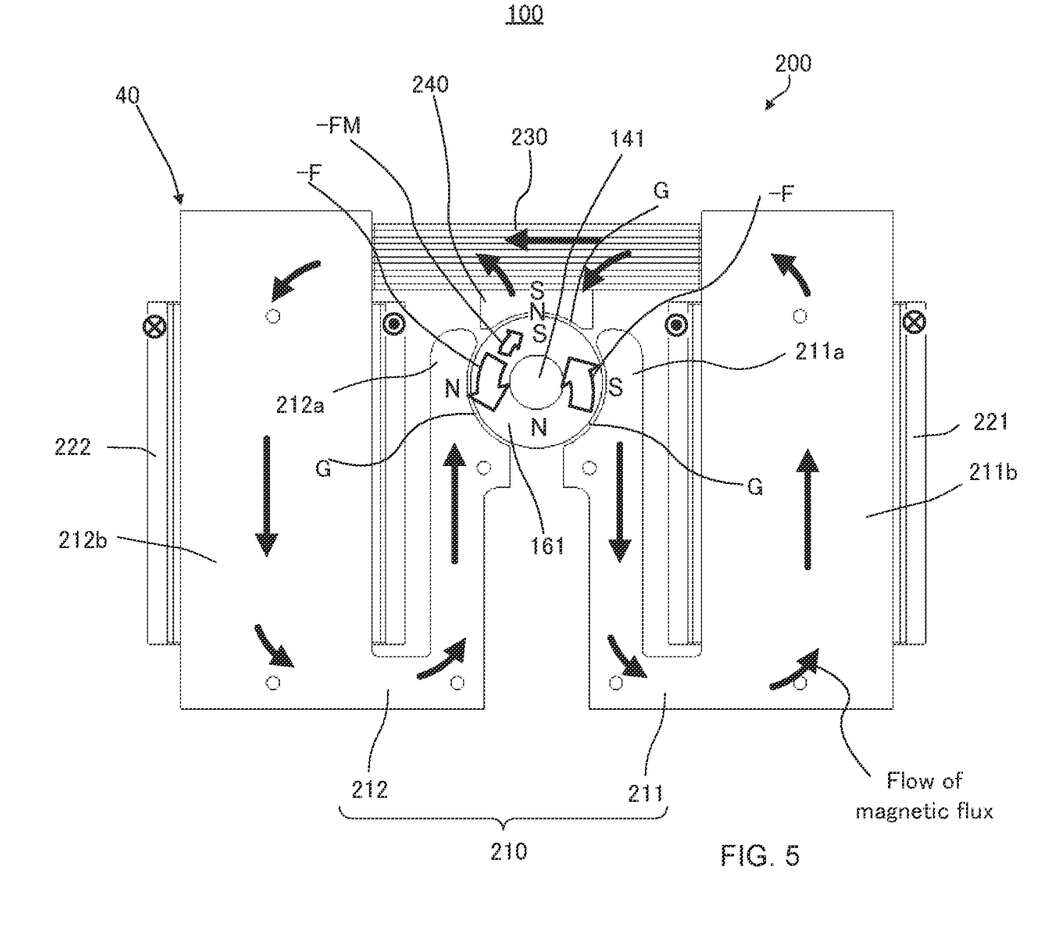
FIG. 5 is a view for explaining the operation of the magnetic circuit of the rotary reciprocating drive actuator.

FIGS. 4 and 5 are views for explaining an operation of a magnetic circuit of rotary reciprocating drive actuator 100.

When coil body 220 (221, 222) is not energized, movable magnet 161 is positioned at the movement reference position by the magnetic attraction force between magnet position holding portion 240 and movable magnet 161, that is, the magnetic spring.

In this movement reference position (hereinafter, the movement reference position may be referred to as a normal state), one of magnetic poles 161a and 161b of movable magnet 161 is attracted to magnet position holding portion 240, and magnetic pole switching portions 161c are positioned at positions facing the center positions of magnetic pole 211a of first core body 211 and magnetic pole 212a of second core body 212.

When coil body 220 is energized, coil body 220 (221, 222) excite first core body 211 and second core body 212.

When coil body 220 is energized in the direction shown in FIG. 4, magnetic pole 211a is magnetized to the N-pole, and magnetic pole 212a is magnetized to the S-pole.

As a result, in first core body 211, a magnetic flux is formed in which the magnetic flux is emitted from magnetic pole 211a magnetized to the N-pole to movable magnet 161, flows through movable magnet 161, magnet position holding portion 240, and bridging core 230 in this order, and enters into core portion 211b.

In second core body 212, the magnetic flux is emitted from core portion 212b to bridging core 230 side, flows through bridging core 230, magnet position holding portion 240, and movable magnet 161 in this order, and enters magnetic pole 212a.

As a result, magnetic pole 211a magnetized to the N-pole is attracted to the S-pole in movable magnet 161, magnetic pole 212a magnetized to the S-pole is attracted to N-pole in movable magnet 161, a torque in the F direction is generated around the axis of shaft portion 141 in movable magnet 161, and movable magnet 161 rotates in the F direction. Accordingly, shaft portion 141 also rotates, and mirror portion 120 fixed to shaft portion 141 also rotates.

Next, as shown in FIG. 5, when the energization direction of coil body 220 is switched to the opposite direction, magnetic pole 211a is magnetized to the S-pole, magnetic pole 212a is magnetized to the N-pole, and the flow of the magnetic flux is also reversed.

As a result, magnetic pole 211a magnetized to the S pole is attracted to the N-pole in movable magnet 161, magnetic pole 212a magnetized to the N-pole is attracted to the S-pole in movable magnet 161, a torque in the direction opposite to the F direction is generated around the axis of shaft portion 141 in movable magnet 161, and movable magnet 161 rotates in the direction opposite to the F direction. Accordingly, shaft portion 141 also rotates in the opposite direction, and mirror portion 120 fixed to shaft portion 141 also rotates in the opposite direction. By repeating these motions, rotary reciprocating drive actuator 100 drives mirror portion 120 in a rotary reciprocating manner.

Figure 6:
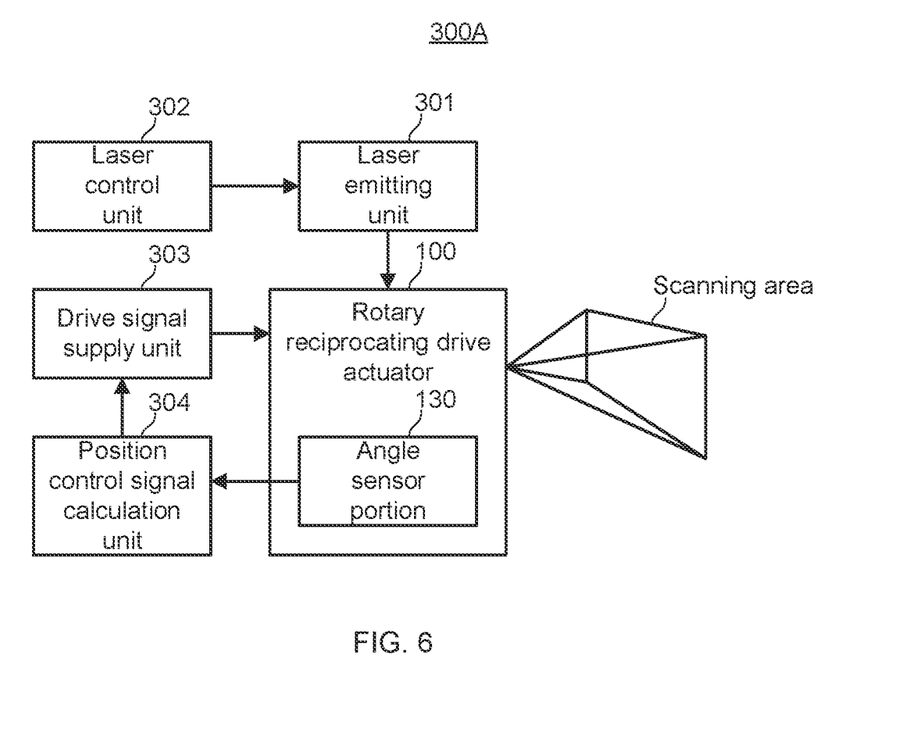
FIG. 6 is a block diagram showing a configuration of main parts of a scanner system using the rotary reciprocating drive actuator.

In practice, rotary reciprocating drive actuator 100 is driven by an alternating current wave input from a power supply unit (for example, corresponding to drive signal supply unit 303 in FIG. 6) to coil body 220. That is, the energization direction of coil body 220 is periodically switched, and the torque in the F direction around the axis and the torque in the direction opposite to the F direction (−F direction) alternately act on the movable body. Thus, the movable body is driven in a rotary reciprocating manner.

Incidentally, at the time of switching the energization direction, the magnetic attraction force between magnet position holding portion 240 and movable magnet 161 is generated, that is, magnetic spring torque FM (FIG. 4) or −FM (FIG. 5) is generated by the magnetic spring, and movable magnet 161 is urged to the movement reference position.

The driving principle of rotary reciprocating drive actuator 100 will be briefly described below. In rotary reciprocating drive actuator 100 of the present embodiment, when the moment of inertia of the movable body is J [kg·m²] and the spring constant in the torsional direction of the magnetic spring (magnetic poles 211a and 212a, magnet position holding portion 240, and movable magnet 161) is $K_{sp}$, the movable body vibrates (rotary reciprocates) with respect to base portion 110 at a resonance frequency $F_r$ [Hz] calculated by the equation (1).

[Equation 1]

$$F_r = \frac{1}{2\pi}\sqrt{\frac{K_{sp}}{J}} \tag{1}$$

$F_r$: Response frequency [Hz]

$J$: Moment of inertia [kg·m²]

$K_{sp}$: Spring constant [N·m/rad]

Since the movable body constitutes a mass portion in a vibration model of a spring—mass system, when an alternating current wave having a frequency equal to the resonance frequency $F_r$ of the movable body is inputted to coil body 220, the movable body enters a resonance state. That is, by inputting the alternating current wave having a frequency substantially equal to the resonance frequency $F_r$ of the movable body to coil body 220 from the power supply unit, the movable body can be efficiently vibrated.

A motion equation and a circuit equation showing the driving principle of rotary reciprocating drive actuator 100 are shown below. Rotary reciprocating drive actuator 100 is driven based on the motion equation expressed by the equation (2) and the circuit equation expressed by the equation (3).

[Equation 2]

$$J\frac{d^2\theta(t)}{dt^2} = K_t i(t) - K_{sp}\theta(t) - D\frac{d\theta(t)}{dt} - T_{Loss} \quad (2)$$

$J$: Moment of inertia $[\text{kg} \cdot \text{m}^2]$ $\theta(t)$: Rotation angle [rad]

$K_t$: Torque constant $[\text{N} \cdot \text{m/A}]$ $i(t)$: Current [A]

$K_{sp}$: Spring constant $[\text{N} \cdot \text{m/rad}]$ $D$: Damping coefficient $[\text{N} \cdot \text{m/(rad/s)}]$ $T_{Loss}$: Load torque $[\text{N} \cdot \text{m}]$

[Equation 3]

$$e(t) = Ri(t) + L\frac{di(t)}{dt} + K_e\frac{d\theta(t)}{dt} \quad (3)$$

$e(t)$: Voltage [V]

$R$: Resistance [Ω]

$L$: Inductance [H]

$K_e$: Counter electromotive force constant $[\text{V/(rad/s)}]$

That is, the moment of inertia J [kg·m²], the rotation angle θ(t) [rad], the torque constant $K_t$ [N·m/A], the current i(t) [A], the spring constant $K_{sp}$ [N·m/rad], the damping coefficient D [N·m/(rad/s)], the load torque $T_{Loss}$ [N·m], and the like of the movable body in rotary reciprocating drive actuator 100 can be appropriately changed within the range satisfying the equation (2). Further, the voltage e(t) [V], the resistance R [Ω], the inductance L [H], and the counter electromotive force constant $K_e$ [V/(rad/s)] can be appropriately changed within the range satisfying the equation (3).

As described above, rotary reciprocating drive actuator 100 can efficiently obtain a large vibration output when the coil is energized by the alternating current wave corresponding to the resonance frequency $F_r$ determined by the moment of inertia J of the movable body and the spring constant $K_{sp}$ of the magnetic spring.

According to rotary reciprocating drive actuator 100 of the present embodiment, since a torque generation efficiency is high, heat is hard to transfer to mirror 121 which is the movable object, and as a result, a flatness of a reflection surface of mirror 121 can be ensured with high accuracy. Further, a manufacturing efficiency is high, an assembly accuracy is good, and even if the movable object is a large sized mirror, it can be driven at a high amplitude.

Note that, rotary reciprocating drive actuator 100 of the present embodiment can be driven by resonance, but can also be driven by non—resonance.

<3> Overview Configuration of Scanner System

Next, a configuration of a scanner system using rotary reciprocating drive actuator 100 will be briefly described.

FIG. 6 is a block diagram showing an essential configuration of scanner system 300A using rotary reciprocating drive actuator 100.

Scanner system 300A includes laser emitting unit 301; laser control unit 302; drive signal supply unit 303; and position control signal calculation unit 304 in addition to rotary reciprocating drive actuator 100.

Laser emitting unit 301 includes, for example, an LD (laser diode) to be a light source; a lens system for converging a laser beam output from the light source, and the like. Laser control unit 302 controls laser emitting unit 301. The laser beam obtained by laser emitting unit 301 is incident on mirror 121 of rotary reciprocating drive actuator 100.

Position control signal calculation unit 304 generates and outputs a drive signal for controlling shaft portion 141 (mirror 121) to be the target angular position with reference to the angular position of shaft portion 141 (mirror 121) acquired by angle sensor portion 130 and the target angular position. For example, position control signal calculation unit 304 generates a position control signal on the basis of the obtained angular position of shaft portion 141 (mirror 121) and a signal indicating the target angular position converted using sawtooth waveform data, and the like stored in a waveform memory which is not illustrated, and outputs the position control signal to drive signal supply unit 303.

Based on the position control signal, drive signal supply unit 303 supplies the drive signal to coil body 220 of rotary reciprocating drive actuator 100 such that the angular position of shaft portion 141 (mirror 121) becomes a desired angular position. Thus, scanner system 300A can emit a scanning light from rotary reciprocating drive actuator 100 to a predetermined scanning area.

Figure 7:
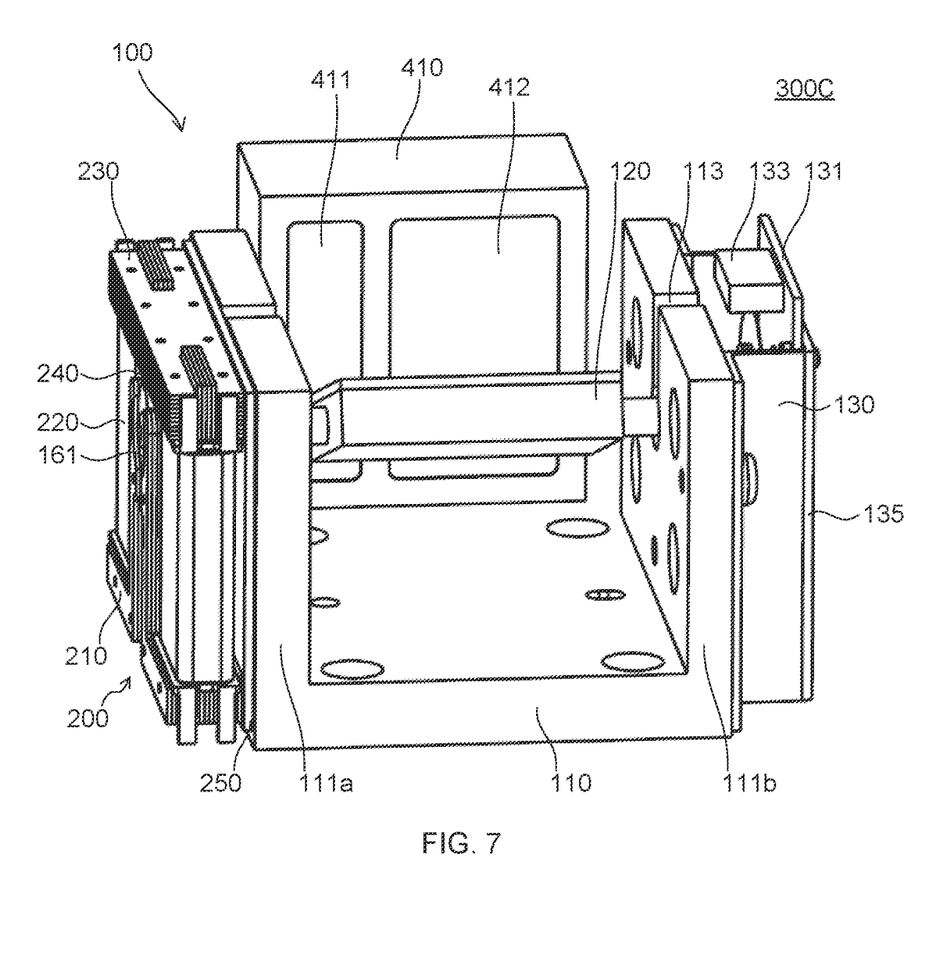
FIG. 7 is an external perspective view showing an exemplary configuration of the scanner system.

FIG. 7 is an external perspective view showing an example of the configuration of the scanner system, in which the same reference signs are assigned to the corresponding parts in FIG. 1. In scanner system 300C, laser unit 410 is provided on base portion 110. Laser unit 410 includes laser emitting unit 411 and laser light receiving unit 412. Thus, a laser beam emitted from laser emitting unit 411 is reflected by mirror portion 120 of rotary reciprocating drive actuator 100 to be a scanning light, and irradiated to a scanning object. The scanning light reflected by the scanning object is received by laser light receiving unit 412 through mirror portion 120. Note that, in rotary reciprocating drive actuator 100 of scanner system 300C, as compared with rotary reciprocating drive actuator 100 of FIG. 1, a bottom plate of base portion 110 is extended in a depth direction in the drawing, and laser unit 410 is installed in this extended portion.

Figure 8:
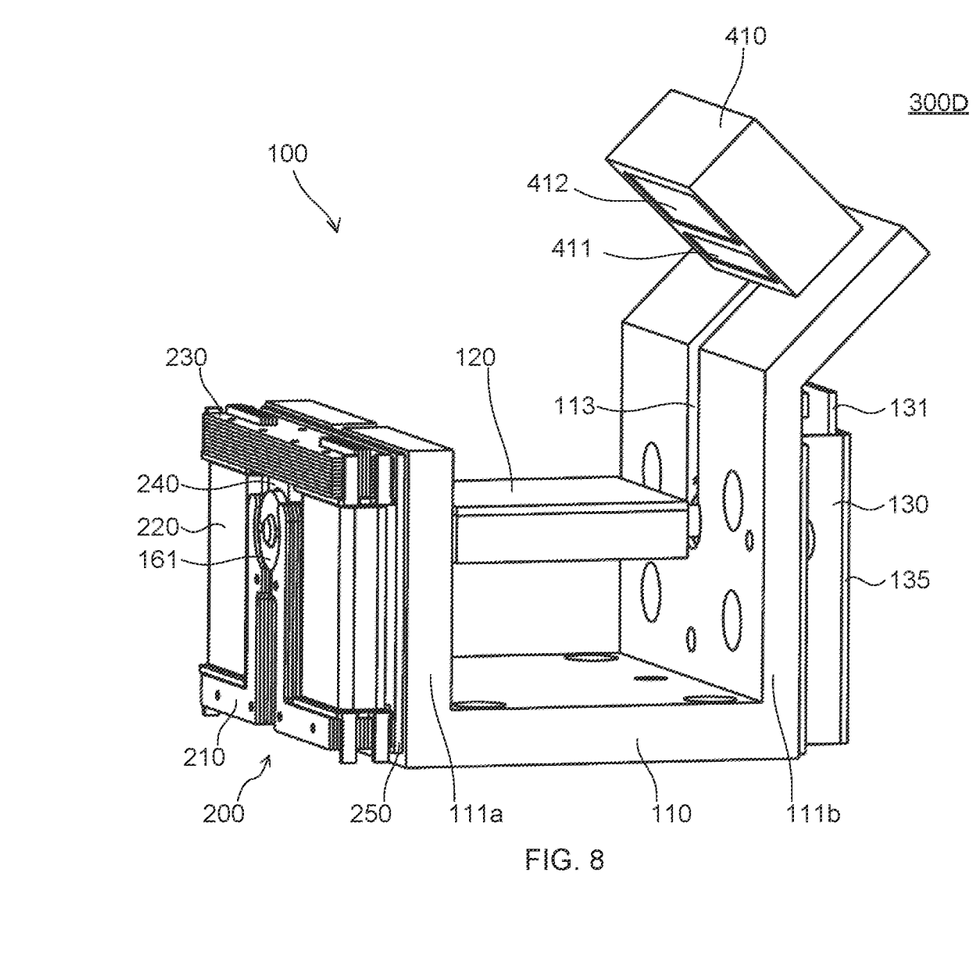
FIG. 8 is an external perspective view showing another exemplary configuration of the scanner system.

FIG. 8 is an external perspective view showing another configuration example of the scanner system, in which the same reference signs are assigned to the corresponding parts in FIG. 7. Scanner system 300D has the same configuration as scanner system 300C except that laser unit 410 is disposed at a different position.

As shown in FIGS. 7 and 8, since laser unit 410 is provided in base portion 110 of rotary reciprocating drive actuator 100, laser unit 410 can be easily and accurately attached to rotary reciprocating drive actuator 100.

Here, if a function as a scanner is to be realized, laser unit 410 may not have laser light receiving unit 412 but may have only laser emitting unit 411. However, in the present embodiment, since laser unit 410 also has laser light receiving unit 412, and laser unit 410 is provided in base portion 110 of rotary reciprocating drive actuator 100, as a result, laser light receiving unit 412 as the light detecting unit is a configuration in which laser light receiving unit 412 is directly attached to the scanner portion. Thus, the positioning accuracy of the laser light receiving unit to the scanner portion can be easily enhanced.

<4> Summary

As described above, rotary reciprocating drive actuator 100 of the present embodiment includes base portion 110; movable magnet 210 fixed to shaft portion 141 to which the movable object (mirror portion 120 in the example of the embodiment) is connected; and drive unit 200 having core body 210 and coil body 220 for generating the magnetic flux in core body 161 when the current is supplied, and driving movable magnet 161 in a rotary reciprocating manner by the electromagnetic interaction between the magnetic flux generated from core body 210 and movable magnet 161. Further, in rotary reciprocating drive actuator 100, movable magnet 161 is formed in the ring shape, and is configured by alternately magnetizing the even number of magnetic poles forming the S-pole and the N-pole at the outer periphery of shaft portion 141; the number of magnetic poles of core body 210 and the number of magnetic poles of movable magnet 161 are equal to each other; the even number of magnetic poles of core body 210 is respectively arranged to face movable magnet 161 with the air gap therebetween on the outer peripheral side of shaft portion 141; and drive unit 200 is provided with magnet position holding portion 240 which is a magnetic material provided to face movable magnet 161 and magnetically attracts movable magnet 161 to a reference position.

Thus, since movable magnet 161 is magnetically attracted to the neutral position (movement reference position) by magnet position holding portion 240 every time the energization direction is switched, good energy efficiency, good responsiveness, and high amplitude rotary reciprocating drive are realized. Further, compared with the rotary reciprocating drive actuator of the coil movable type, the heat generated by coil body 220 is hard to transfer to the movable object, and when the movable object is a mirror, it is possible to prevent adverse effects (bond deterioration, warpage, etc.) of the heat from affecting the mirror.

In addition, in rotary reciprocating drive actuator 100 of the present embodiment, the pair of wall portions 111a and 111b for rotatably supporting shaft portion 141 via bearings (ball bearings 151) are provided in base portion 110, the movable object (mirror portion 120 in the example of the embodiment) is disposed between the pair of wall portions 111a and 111b. Drive unit 200 is attached to the outer surface side of one wall portion 111a of the pair of wall portions 111a and 111b, and angle sensor portion 130 for detecting the rotation angle of shaft portion 141 is attached to the outer surface side of the other wall portion 111b of the pair of wall portions 111a and 111b.

This makes it easy to remove angle sensor portion 130 and adjust the assembly position thereof. Since angle sensor portion 130 can be easily removed, angle sensor portion 130 can be easily replaced when the failure occurs in angle sensor portion 130. Further, angle sensor portion 130 can be assembled at the final stage of assembly. As a result, the expensive angle sensor portion 130 can be assembled after it is confirmed that the assembly of the other components is normal. Therefore, the risk of wasting the expensive angle sensor portion 130 due to the assembly failure of the other components can be suppressed.

In one aspect of the present invention, the reference position at which magnet position holding portion 240 magnetically attracts movable magnet 161 is the rotational center position of the rotating reciprocation of movable magnet 161.

In one aspect of the present invention, in movable magnet 161, the even number of magnetic poles is magnetized at equal intervals at the outer periphery of shaft portion 141.

In one aspect of the present invention, magnet position holding portion 240 is disposed at the position between the even number of magnetic poles of core body 210 and at the position facing movable magnet 161 in the radial direction of movable magnet 161.

These configurations can maximize a driving torque and stabilize a direction of the driving torque.

The above embodiments are merely specific examples for carrying out the present invention, and the technical scope of the present invention should not be construed to be limited by them. That is, the present invention can be implemented in a variety of ways without departing from the spirit or essential features thereof.

In the above embodiment, the case where wall portion 111b to attach angle sensor portion 130 is formed integrally with base portion 110 is described. A wall portion to attach angle sensor portion 130, however, may not be formed integrally with base portion 110 but may be attached to the base portion later.

Figure 9:
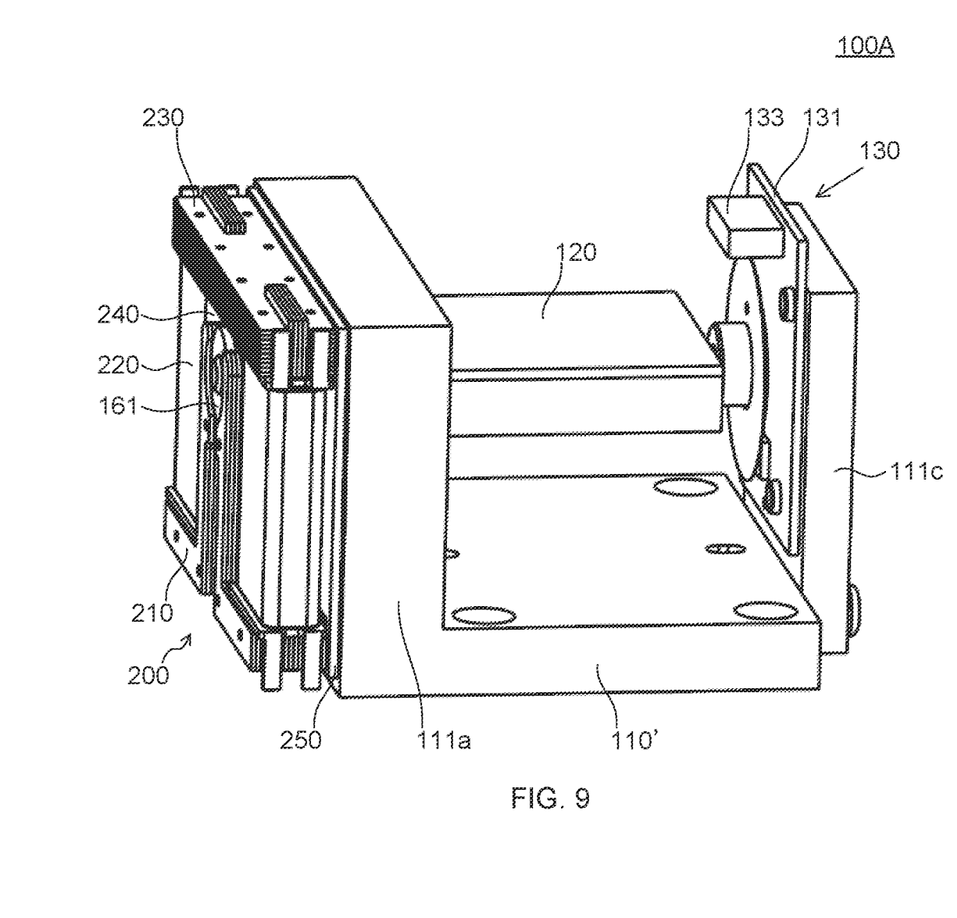
FIG. 9 is an external perspective view of the rotary reciprocating drive actuator of another embodiment.
Figure 10:
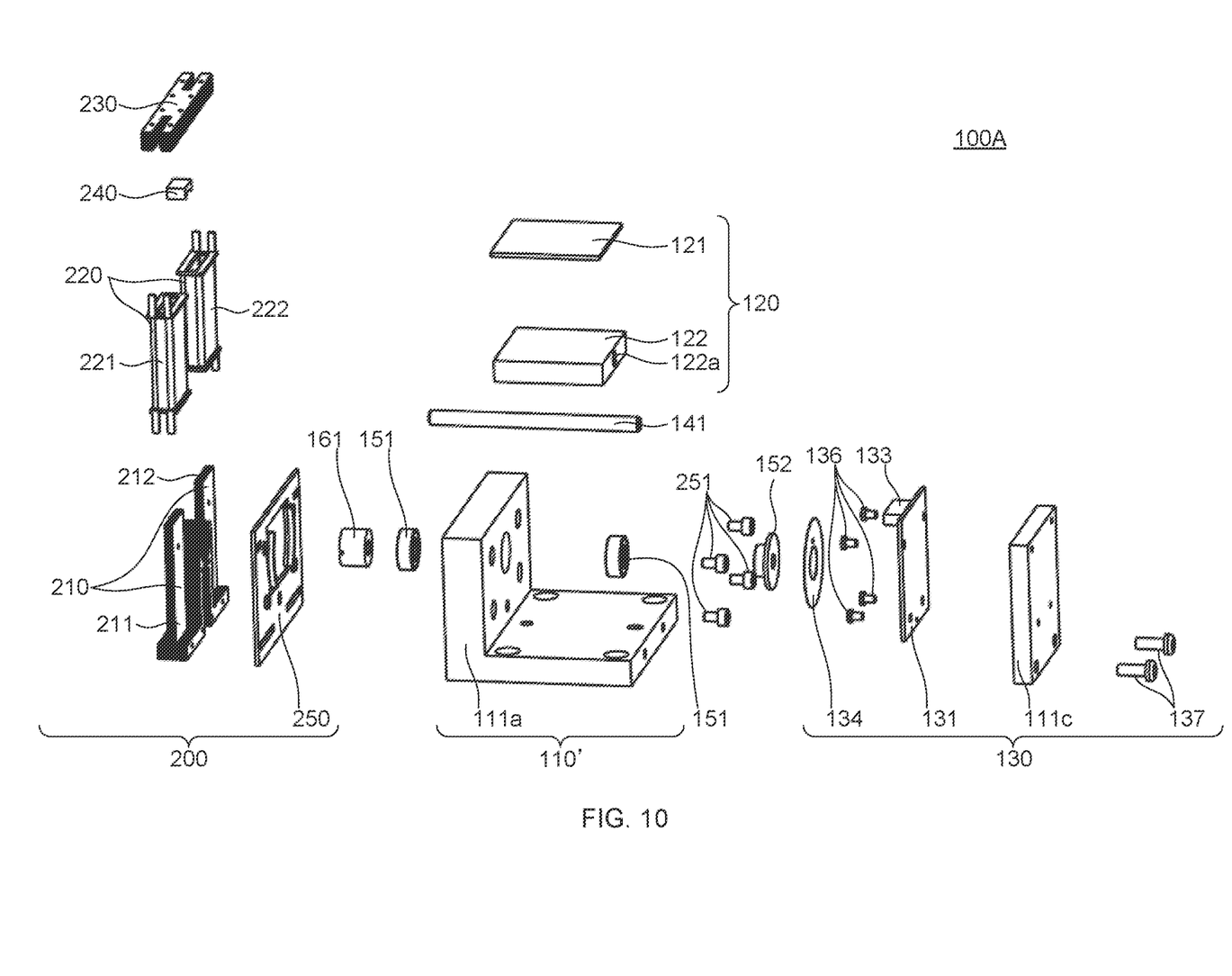
FIG. 10 is an exploded perspective view of the rotary reciprocating drive actuator of another embodiment.

Specifically, as shown in FIG. 9 in which the same reference signs are assigned to the corresponding portions in FIG. 1 and FIG. 10 in which the same reference signs are assigned to the corresponding portions in FIG. 2, rotary reciprocating drive actuator 100A has an L shaped base portion 110'. In rotary reciprocating drive actuator 100A, wall portion 111c to which angle sensor portion 130 is attached to the inner surface is attached to base portion 110'. In this configuration, since wall portion 111c can be removed from or relatively moved with respect to base portion 110', angle sensor portion 130 can also be easily removed and the assembling position can be easily adjusted. However, as in the above embodiments, the configuration in which angle sensor portion 130 is attached to the outer surface side of wall portion 111b is easier to remove and adjust the assembling position of angle sensor portion 130.

In the above embodiments, the case where ball bearings 151 are used as bearings for rotatably attaching shaft portion 141 to base portion 110 is described. The present invention, however, is not limited thereto, and an air bearing, an oil bearing and other bearings may be used as bearings.

In the above embodiments, the case where drive unit 200 is mounted on the outer surface side of wall portion 111a is described. The position of drive unit 200, however, is not limited thereto. Dive unit 200 may be mounted, for example, on the inner surface side of wall portion 111a.

In the above embodiments, the case where the movable object driven by rotary reciprocating drive actuator 100, that is, the movable object attached to shaft portion 141 is mirror portion 120 is described. The movable object, however, is not limited thereto. For example, a camera or the like may be the movable object.

INDUSTRIAL APPLICABILITY

The present invention is suitable for a scanner, for example.

REFERENCE SIGNS LIST 100, 100A Rotary reciprocating drive actuator
110, 110' Base portion
111a, 111b, 111c Wall portion
112 Insertion hole
113 Notched hole 114 Bearing mounting portion
120 Mirror portion
121 Mirror
122 Substrate
122a Insertion hole
130 Angle sensor portion
131 Circuit board
132 Optical sensor
133 Connector
134 Encoder disk
135 Case
136, 137, 251 Fastening member
138 Mounting member
141 Shaft portion
151 Ball bearing
161 Movable magnet
161c Magnetic pole switching portion
200 Drive Unit
210 Core body
211 First core body
212 Second core body
220 Coil body
221 First coil body
222 Second coil body
230 Bridging core
240 Magnet position holding portion
250 Fixing Plate
300A, 300C, 300D Scanner system
301, 411 Laser emitting unit
302 Laser control unit
304 Position control signal calculation unit
410 Laser Unit
412 Laser light receiving unit

What is claimed is:

1. A rotary reciprocating drive actuator comprising:
a base portion including a bottom portion, and a pair of wall portions erected from both ends of the bottom portion such that inner side surfaces of the wall portions face each other;
a movable body including a shaft portion rotatably supported by the pair of the wall portions via a bearing in such a manner that a movable object is disposed inside the pair of the wall portions, and a movable magnet disposed at an outer side surface, to be an outer side of the base portion, in one wall portion of the pair of the wall portions;
a drive unit including a core body having an even number of magnetic poles to face an outer periphery of the movable magnet so as to sandwich the movable magnet, and a coil body wound around the core body and that generates a magnetic flux interacting with the movable magnet by energization to rotary reciprocate the movable body, the drive unit being attached to the outer side surface of the one wall portion; and
an angle sensor portion attached to another wall portion of the pair of the wall portions and that detects a rotation angle of the shaft portion,
wherein the another wall portion of the pair of wall portions is configured to be detachable from or adjustable in position with respect to the bottom portion.

2. The rotary reciprocating drive actuator according to claim 1,
wherein the angle sensor portion is attached to an inner side surface of the another wall portion.

3. The rotary reciprocating drive actuator according to claim 1,
wherein the core body includes a pair of a first core body and a second core body extending in parallel to each other, and
the movable magnet is, at least, partially disposed between the magnetic poles disposed at each end of the pair of the first core body and the second core body.

4. The rotary reciprocating drive actuator according to claim 1,
wherein the drive unit includes a magnet position holding portion that generates a magnetic attraction force between the movable magnet to define a reference position of a rotary reciprocation.

5. The rotary reciprocating drive actuator according to claim 1,
wherein the movable object is a mirror that reflects a scanning light.

6. A scanner system comprising:
the rotary reciprocating drive actuator according to claim 5; and
a laser emitting and receiving unit disposed at the base portion, that emits the scanning light to the mirror, and receives the scanning light reflected by a scanning object via the minor.

* * * * *